(12) United States Patent
Inoue et al.

(10) Patent No.: US 6,971,750 B1
(45) Date of Patent: *Dec. 6, 2005

(54) PROJECTION DISPLAY APPARATUS

(75) Inventors: Shunsuke Inoue, Yokohama (JP); Osamu Hamamoto, Isehara (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 43 days.

(21) Appl. No.: 09/472,989

(22) Filed: Dec. 28, 1999

(30) Foreign Application Priority Data

Dec. 28, 1998 (JP) ................................. 10-374424

(51) Int. Cl.$^7$ ............................................. G03B 21/10
(52) U.S. Cl. ............................. 353/74; 353/72; 345/84; 349/7
(58) Field of Search ............................. 345/87, 50, 90, 345/84, 85, 88; 353/74, 79, 75, 72, 71, 82; 349/7, 8

(56) References Cited

U.S. PATENT DOCUMENTS

| | | | | |
|---|---|---|---|---|
| 4,200,794 A | * | 4/1980 | Newberry et al. | 313/414 |
| 5,147,127 A | * | 9/1992 | Honda et al. | 362/23 |
| 5,184,176 A | * | 2/1993 | Unno et al. | 355/52 |
| 5,283,802 A | * | 2/1994 | Hsiung | 372/107 |
| 5,387,901 A | * | 2/1995 | Hardt | 340/815.42 |
| 5,446,635 A | * | 8/1995 | Jehn | 362/259 |
| 5,506,629 A | * | 4/1996 | Kawahara et al. | 348/776 |
| 5,694,190 A | * | 12/1997 | Matsumoto et al. | 349/151 |
| 5,842,761 A | * | 12/1998 | Futukami et al. | 353/119 |
| 5,888,076 A | * | 3/1999 | Itoh et al. | 439/74 |
| 5,926,238 A | | 7/1999 | Inoue et al. | 349/61 |
| 5,933,018 A | * | 8/1999 | Komatsu | 324/755 |
| 5,936,850 A | * | 8/1999 | Takahashi et al. | 361/784 |
| 5,963,283 A | * | 10/1999 | Omae et al. | 349/86 |
| 6,229,595 B1 | * | 5/2001 | McKinley et al. | 355/53 |
| 6,271,910 B1 | * | 8/2001 | Uzawa | 355/55 |

* cited by examiner

*Primary Examiner*—Xiao Wu
*Assistant Examiner*—Abbas Abdulselam
(74) *Attorney, Agent, or Firm*—Fitzpatrick, Cella, Harper & Scinto

(57) ABSTRACT

A projection display apparatus includes a display panel provided with first electrodes, a circuit board provided with a drive circuit including second electrodes for driving the display panel, a projection lens support provided with a projection lens for projecting an enlarged image onto a screen, and a holder provided with a connector for the first and second electrodes and with a positioning device for the holder and the projection lens support. The first electrodes of the display panel and the second electrodes of the circuit board are electrically connected by the connector of the holder, respectively. The projection lens support is positionally aligned and connected with the holder by the positioning device for optical alignment of the projection lens.

1 Claim, 12 Drawing Sheets

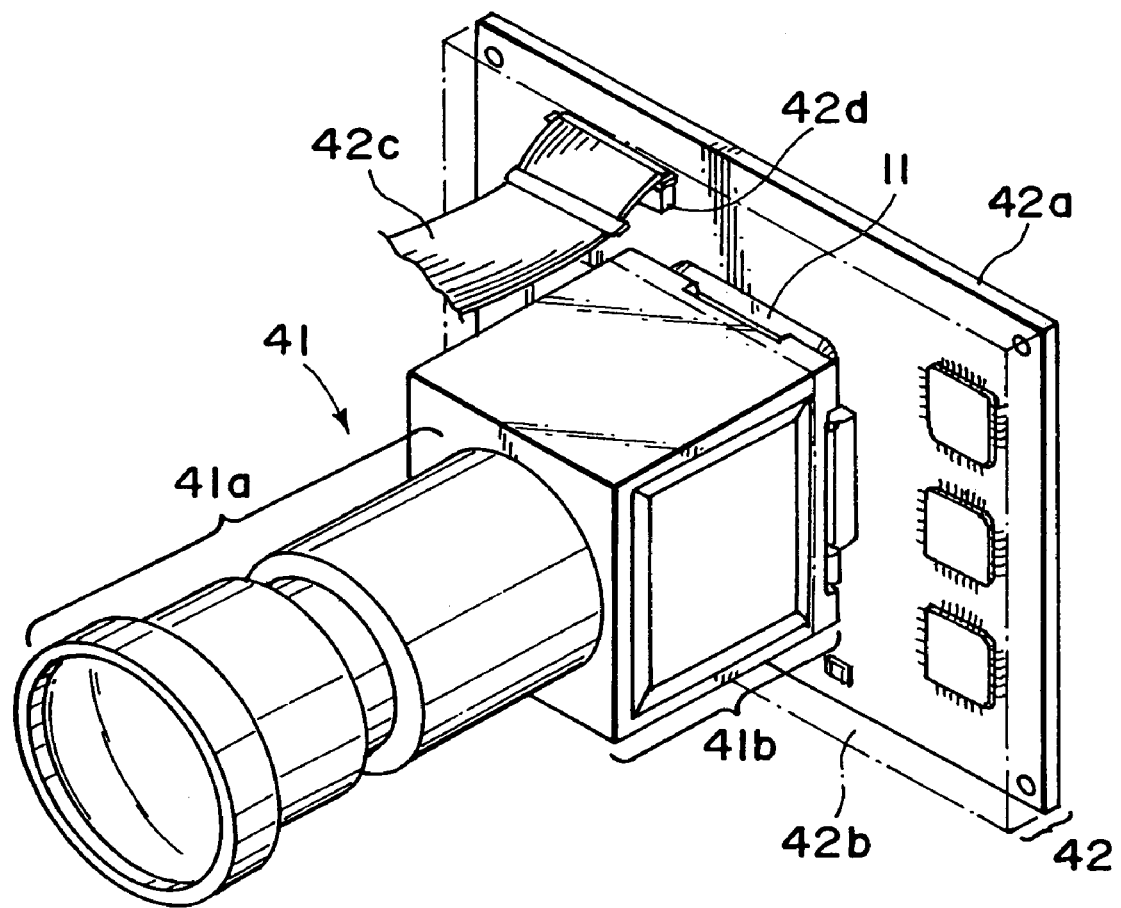
F I G. 1

PROJECTION DISPLAY APPARATUS

FIELD OF THE INVENTION AND RELATED ART

The present invention relates to a projection-type display apparatus, and particularly, a projection-type liquid crystal display apparatus for projecting a modulated picture (image) in an enlarged size onto a screen.

As one of liquid crystal display apparatus, a projection-type liquid crystal display apparatus has been proposed. FIG. 12 is a perspective view of an embodiment of a conventional projection-type liquid crystal display apparatus.

Referring to FIG. 12, the projection-type liquid crystal display apparatus includes a liquid crystal panel 102, a drive circuit substrate 104 for driving the liquid crystal panel 102, a harness (a unit of input and output electrode wires or cables) 105 for the drive circuit substrate 104, a flexible substrate 103 having a plurality of connecting electrodes for connecting the liquid crystal panel 102 to the drive circuit substrate 104, and a projection lens unit 101 for projecting an image based on an image signal outputted via the flexible substrate 103.

The liquid crystal panel 102 is firmly attached and fixed to the projection lens unit 101, e.g., by locating pins so that an optical axis (of an optical system) is in alignment with a focus (of a projection lens). The (positional) alignment of the projection lens unit 101 with the liquid crystal panel 102 is performed by driving the liquid crystal panel 102 while viewing an output image based on an (outputted) image signal.

The drive circuit substrate 104 not only drives the liquid crystal panel 102 but also amplifies and outputs a display signal received from a substrate (not shown) via the harness 105. The length of the flexible substrate 103 may generally be determined based on an arrangement and connecting positions of the drive circuit 104 and the liquid crystal panel 102. The connecting position of the flexible substrate 103 with the drive circuit substrate 104 is ordinarily set to be relatively closer to that with the liquid crystal panel 102.

The conventional projection-type liquid crystal display apparatus having the above-mentioned structure, however, has encountered the following difficulties.

In the conventional liquid crystal display apparatus, the liquid crystal panel 102 and the projection lens unit 101 are firmly fixed in a well aligned state. For this reason, in order to replace a part of structural member (e.g., the liquid crystal panel 102) with another one, it is necessary to detach or remove the liquid crystal panel 102 from the projection lens unit 101 every time. Further, a troublesome alignment operation has to be effected again at that time.

Further, in order to increase the number of pixels of the liquid crystal panel 102 to improve display image qualities of the projection-type liquid crystal display apparatus, it is necessary to re-design the substrate 104 provided with a drive circuit and re-assemble parts into a projection-type liquid crystal display apparatus. In that regard, a size and/or a shape of the drive circuit may generally be changed, thus requiring a re-arrangement of all the respective parts (structural members) based on the changed drive circuit.

The flexible substrate 103 may be ordinarily comprised of a plurality of conductor lines (electrodes) and an insulating material surrounding the conductor lines. Accordingly, the flexible substrate 103 functions as an antenna for electrical noises (particularly from a high-voltage supply unit (not shown) such as a power supply circuit), thus being liable to be susceptible to electrical noises. Such noises disturb image signals and/or driving pulses, thus causing a deterioration in display image qualities.

Further, the flexible substrate 103 provides a self-generating noise proportional to a product of L×C wherein C denotes a capacitive component and L denotes an inductance. This is particularly noticeable with an increased number of pixels of the liquid crystal panel 102 leading to provide a higher drive frequency. For this reason, it is difficult to improve the resultant image qualities by increasing the number of pixels.

The conventional projection-type liquid crystal display apparatus described above generally outputs analog image signals from the drive circuit substrate 104 to the liquid crystal panel 102 in many cases. However, in recent years, a projection-type liquid crystal display apparatus employing digital image signals has been preferentially used. The projection-type liquid crystal display apparatus using the digital signals ordinarily requires a flexible substrate 103 having the number of pins (terminals) of at least 100. However, at present, such a flexible substrate is not available. Accordingly, it is necessary to provide the projection-type liquid crystal display apparatus using the digital signals with a plurality of flexible substrates in order to ensure at least 100 pins.

Further, a liquid crystal panel is considerably improved technically in a short period, thus becoming a commonplace one in several months in some cases. When an expensive liquid crystal panel is changed in its specification, it has been difficult to replace only the expensive liquid crystal panel with another one in the conventional projection-type liquid crystal display apparatus. For this reason, the resultant commonplace display apparatus deteriorates its value as a commercial product and is disposed of without being reused in some cases.

SUMMARY OF THE INVENTION

A principal object of the present invention is to provide a projection-type liquid crystal display apparatus having solved the above-mentioned problems.

A specific object of the present invention is to provide a projection display apparatus including a circuit board, a display panel and a projection lens support integrally assembled via a holder for holding the display panel without using a flexible substrate so that electrodes of the circuit board and the display panel are electrically connected while positionally aligning the projection lens support with the holder.

Another object of the present invention is to provide a projection display apparatus allowing optical alignment of a projection lens with a display panel and easy replacement of the display panel with another one.

According to the present invention, there is provided a projection display apparatus, comprising:
- a display panel provided with first electrodes,
- a circuit board provided with a drive circuit including second electrodes for driving the display panel,
- a projection lens support provided with a projection lens for projecting an enlarged image onto a screen, and
- a holder provided with a connector for the first and second electrodes and with positioning means for the holder and the projection lens support, wherein
- the first electrodes of the display panel and the second electrodes of the circuit board are electrically connected by the connector of the holder, respectively, and the projection lens support is positionally aligned and connected with the holder by the positioning means for optical alignment of the projection lens.

Specifically, the projection display apparatus includes:
a display panel provided with first electrodes,
a circuit board provided with a drive circuit including second electrodes for driving the display panel,
a projection lens support provided with a projection lens for projecting an enlarged image onto a screen, and
a holder for holding therein the display panel disposed between the circuit board and the projection lens support and provided with a connector for the first and second electrodes and with positioning means for the holder and the projection lens support. The display panel is incorporated in the holder and connected with the circuit board via the holder so that the first and second electrodes are electrically connected by the connector of the holder, and the projection lens support is positionally aligned with the holder by the positioning means for optical alignment of the projection lens and is connected with the circuit board via the display panel incorporated in the holder thereby to form an integrated structure of the projection lens support, the display panel and the circuit board via the holder.

According to the present invention, there is also provided a projection display apparatus, comprising:
a display panel,
a circuit board provided with a drive circuit for driving the display panel,
a projection lens support provided with a projection lens for projecting an enlarged image onto a screen, and
a holder for holding the display panel and provided with positioning means for the holder and the projection lens support, wherein
the projection lens support is positionally aligned and connected with the holder by the positioning means, and
the display panel held by the holder and the projection lens support are integrally fixed on the circuit board by a fixing screw.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a perspective view of an embodiment of a projection display apparatus according to the present invention.

DETAILED DESCRIPTION OF THE PREFERRED EMBODIMENTS

Figure 2:
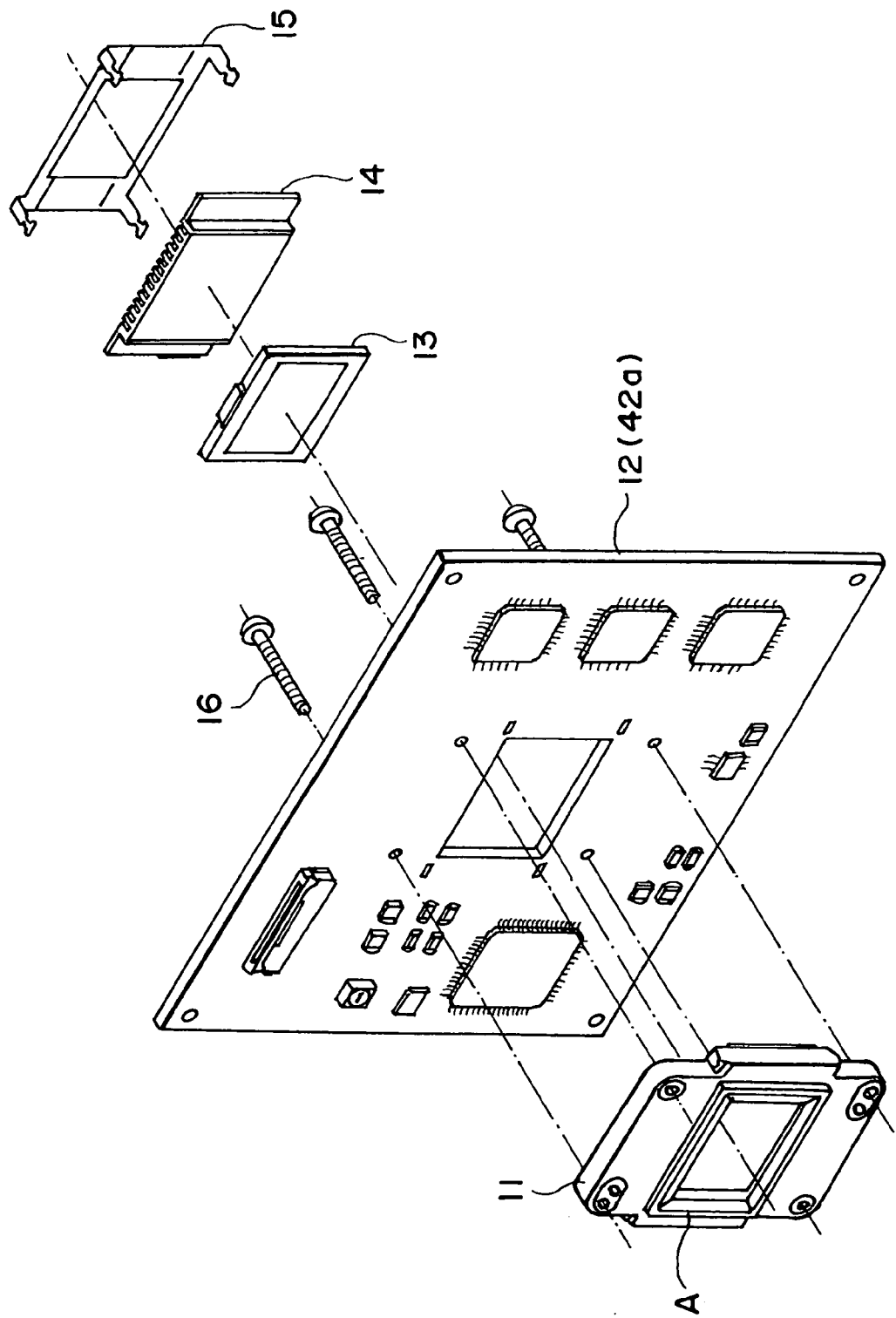
FIG. 2 is an exploded perspective view of a circuit board and associated parts including a holder and a liquid crystal display panel to be connected with the circuit board.

Hereinbelow, preferred embodiments of the projection-type liquid crystal display apparatus according to the present invention will be described with reference to the drawings.

FIG. 1 illustrates a perspective structure of the projection liquid crystal display apparatus of the present invention.

Referring to FIG. 1, the projection display apparatus includes a projection lens unit 41 and a replacement unit 42.

The replacement unit 42 includes a printed circuit board (abbreviated as "PCB") 42a on which a liquid crystal display panel (not shown) and a drive circuit (not shown) are integrally disposed and a shield member 42b for preventing radiation noises disposed so as to cover an exposed surface of the PCB 42a.

The replacement unit 42 is provided with a connecting terminal 42c for connecting a harness at a harness connecting portion 42d. The harness is connected with an external interface (not shown) or a power supply circuit board (not shown).

The projection lens unit 41 includes a projection lens portion 41a including a projection lens and a polarization beam splitter (PBS) portion 41b for polarizing incident light as a projection lens support.

The projection lens unit 41 and the replacement unit 42 are positionally aligned with each other via a holder 11 at a prescribed position.

FIG. 2 is an exploded perspective view for illustrating an assembly portion of a liquid crystal display apparatus used in the projection liquid crystal display apparatus of the present invention.

Referring to FIG. 2, the projection liquid crystal display apparatus includes a liquid crystal display panel socket 11 as a holder for holding a liquid crystal display panel; a circuit board 12 provided with a (peripheral) drive circuit for driving a liquid crystal display panel; a liquid crystal display panel 13; a heat-dissipating pressing plate 14 for dissipating heat from the liquid crystal display panel 13 while pressing the liquid crystal display panel 13 against the liquid crystal display panel socket 11; a hook 15 provided to the socket 11 via the circuit board 12, the display panel 13 and the pressing plate 14; and fixing screws 16 for fixing the socket on the circuit board 12.

The hook 15 has four foots fitted into corresponding for recesses via through holes provided to the circuit board 12, thus being attached to the socket 11. The socket 11 is fixed on the circuit board 12 by means of the fixing screws 16 in advance. Accordingly, when the hook 15 is attached to the socket 11, respective structural members (including the socket 11, circuit board 12, display panel 13, pressing plate 14 and hook 15) are integrally assembled into a single (replacement) unit.

The (liquid crystal display panel) socket 11 has positioning means for effecting positional alignment with the polarization beam splitter (projection lens support) portion 41b of the projection lens unit 41 (shown in FIG. 1).

The positioning means may, e.g., be a rectangular projection A as shown in FIG. 2, a rectangular recess or any shape allowing positional alignment with the projection lens support.

Figure 3:
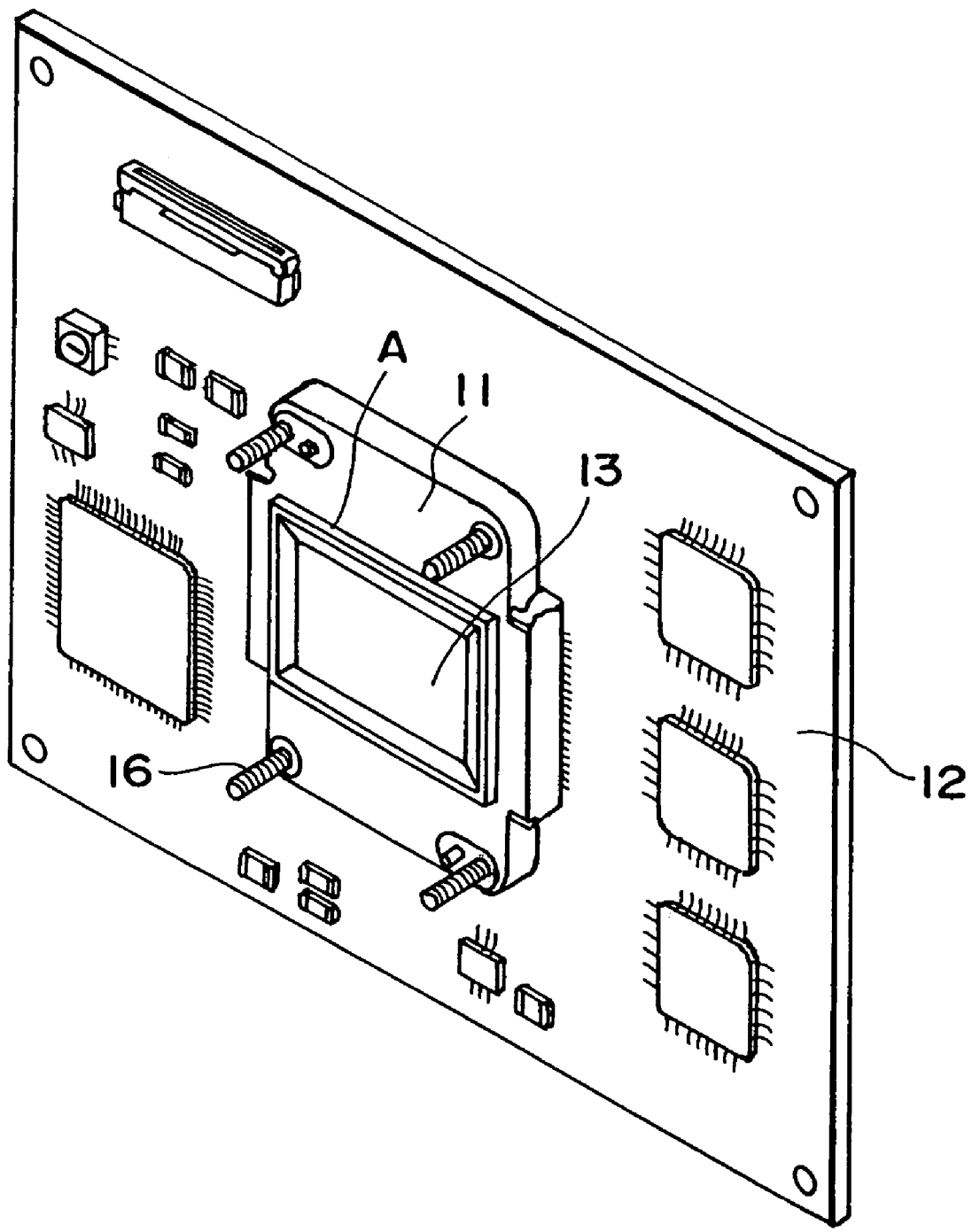
FIG. 3 is a perspective view of the circuit board to which the holder and the liquid crystal display panel are connected.

FIG. 3 illustrate a perspective view of fixing state of the liquid crystal display panel socket 11 on the circuit board 12.

Referring to FIG. 3, the socket (holder) 11 is fixed on the circuit board 12 by fixing screws 16. The liquid crystal display panel 13 is incorporated into the socket 11.

Figure 4:
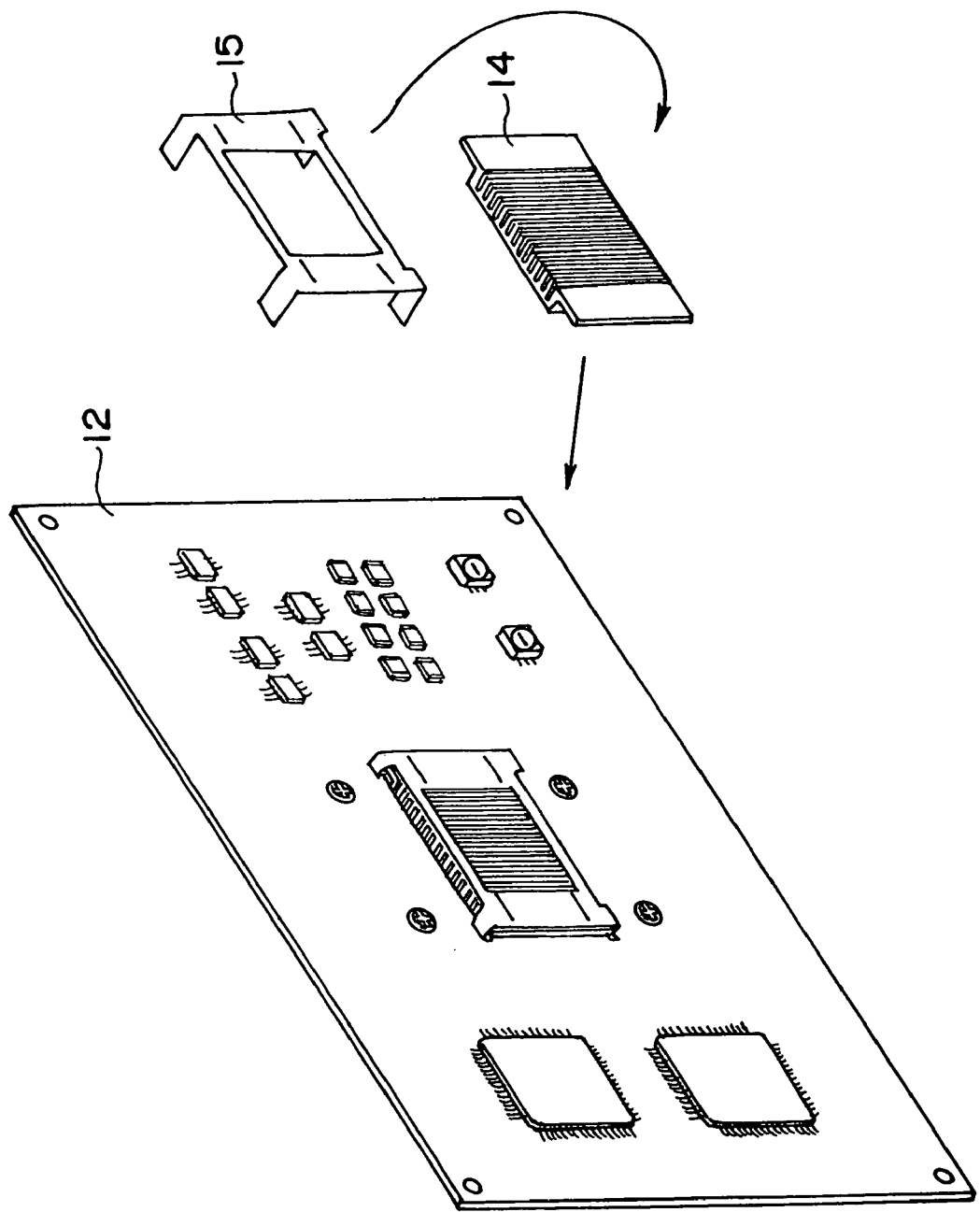
FIG. 4 is a perspective view of the circuit board to which a heat-dissipating pressing plate is connected by a hook.

FIG. 4 illustrates the backside of the circuit board 12 shown in FIG. 3.

Referring to FIG. 4, a heat-dissipating pressing plate 14 is fixed on the display panel 13 held by the socket (11 shown in FIG. 3) by fixing four foots of a hook 15 into corresponding recesses of the socket, thus pressing the pressing plate 14 against the display panel 13. The pressing plate 14 is provided with plurality of recesses or grooves for improving a heat-dissipation efficiency.

Figure 5:
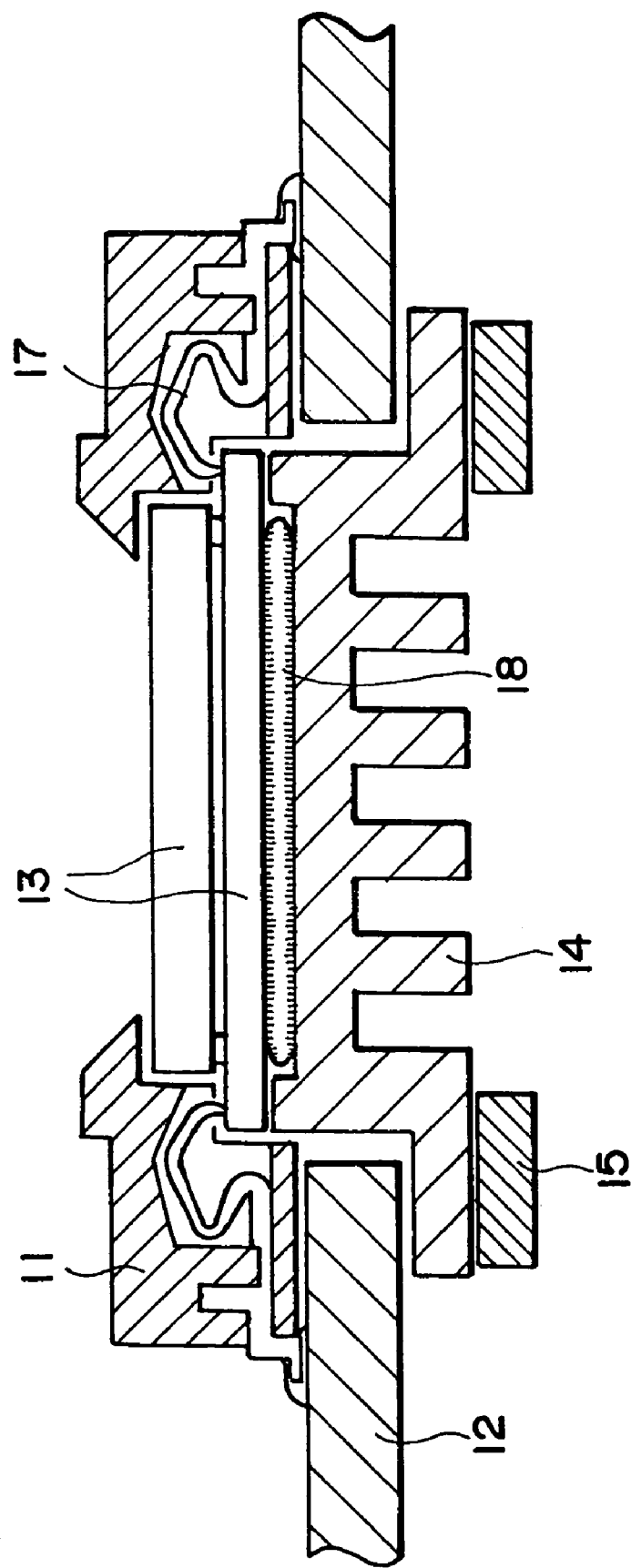
FIG. 5 is a sectional view of a liquid crystal display panel-connected portion of a circuit board of the projection display apparatus of the present invention.

FIG. 5 is an enlarged sectional view showing a connected (held) state of the liquid crystal display panel 13 incorporated in the liquid crystal display panel socket (holder) 11.

Figure 11:
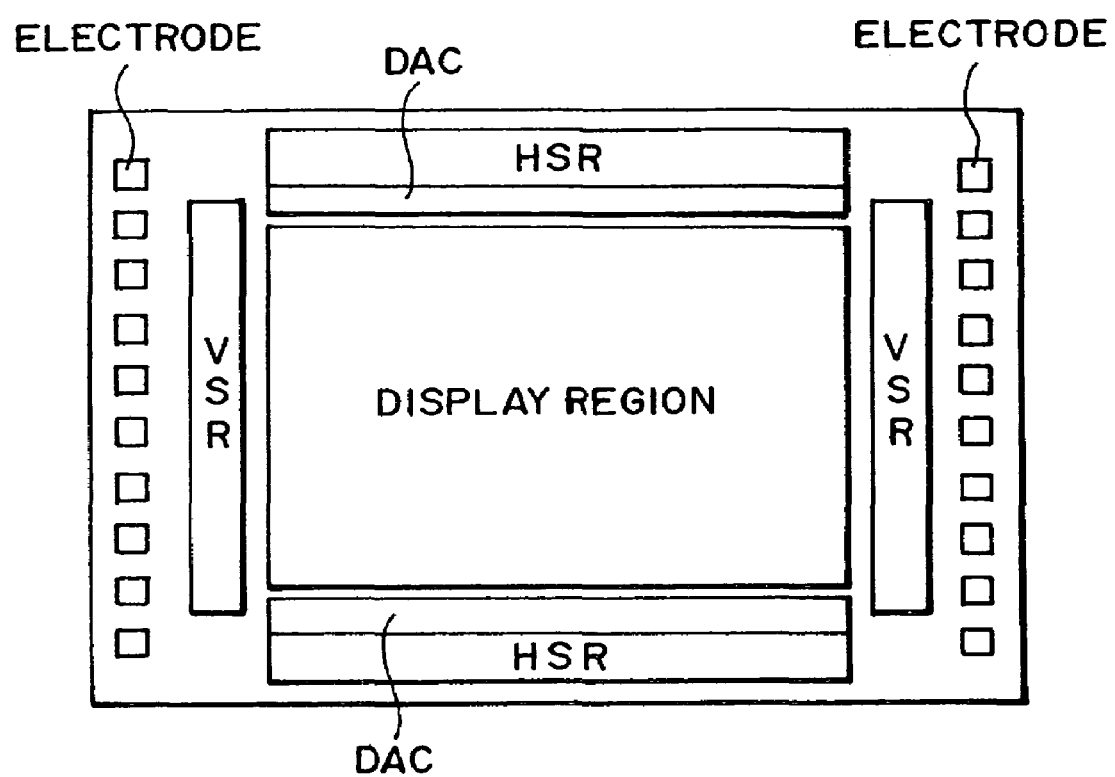
FIG. 11 illustrates a circuit chip (part) arrangement on a substrate of the liquid crystal display panel.
Figure 12:
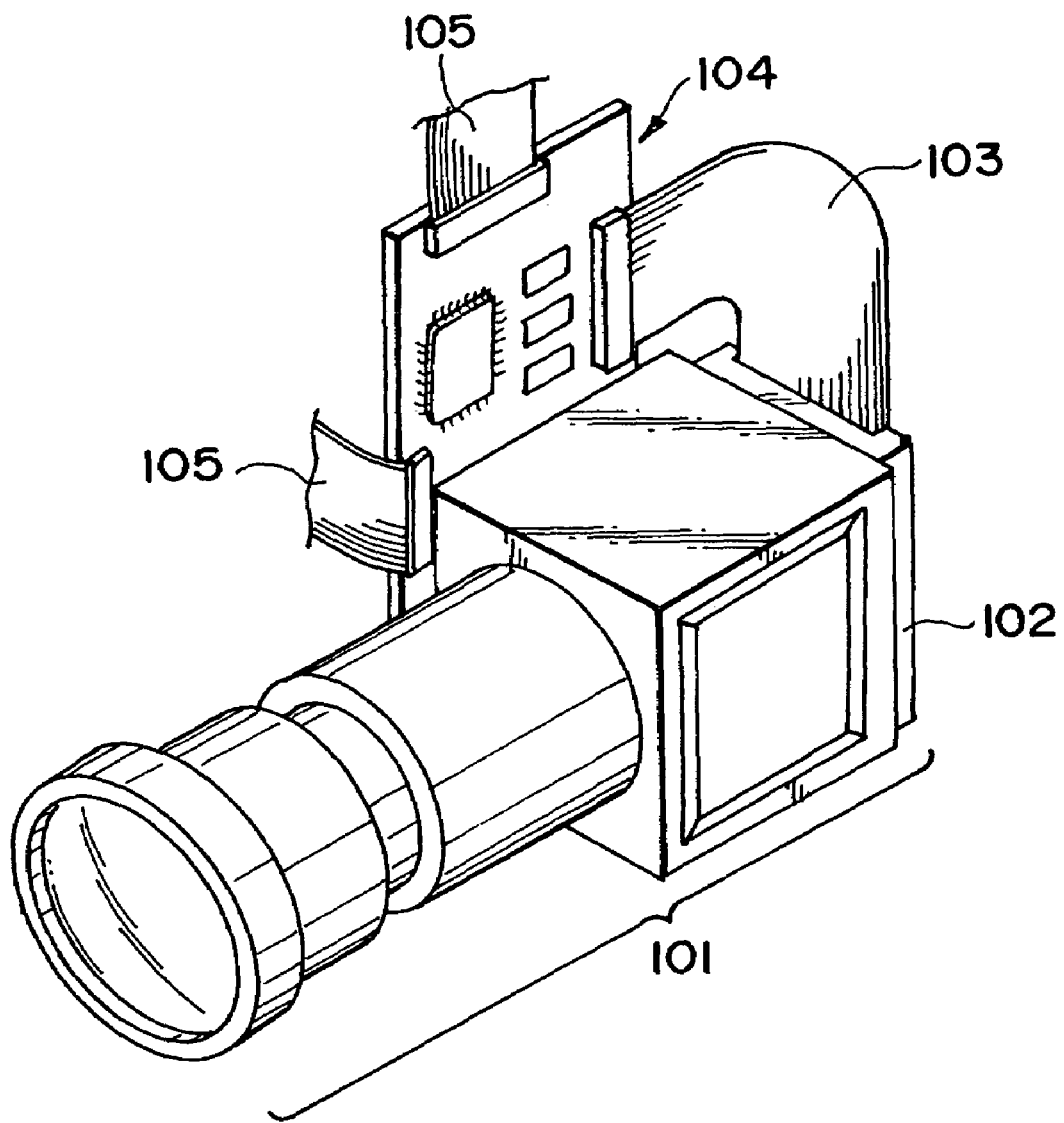
FIG. 12 is a perspective view of an embodiment of a conventional projection display apparatus.

Referring to FIG. 4, an electrical connection of the liquid crystal display panel 13 with the circuit board 12 by electrically connecting (first) electrodes of the display panel 13 with corresponding contact terminals 17 as a connector provided within the socket 11. The electrodes of liquid crystal display panel 13 are led out on shorter two parallel sides thereof (e.g., as shown in FIG. 11) and electrically connected with the connector including a prescribed number of contact terminals 17 determined so as to coincide with the number of the electrodes of the display panel 13. On the other hand, an electrical connection of the contact terminals 17 with (second) electrodes of the drive circuit provided on the circuit board 12 is performed by not only contacting the contact terminals 17 with corresponding electrodes on the circuit board 12 but also fixing the terminals 17 to the electrodes (on the circuit board 12) by soldering, thus ensuring a firmly fixed state.

The electrical connection of the (first) electrodes of the display panel 13 with those (second electrodes) of the circuit board 12 via the connector (contact terminals) 17 is performed by pressing the pressing plate 14 against the display panel 13 by the hook 15 thereby to contact the electrodes of the display panel 13 with the corresponding contact terminals 17, respectively, on one side thereof, preliminarily connected with the electrodes of the circuit board 12 by soldering on the other side. In this instance, the soldering may be performed after fixing the hook 15 on the socket 11.

The contact terminals 17 may preferably be pressed against the electrodes of the display panel 13 at a contact load of at least 5 g/pin. Further, the electrodes of the display panel 13 may be preliminarily coated with a corrosion-resistant material and at the time of contact with the contact terminals 17, the pressed contact terminals 17 break the corrosion-resistant coating thus effectively suppressing corrosion of the electrodes.

Referring again to FIG. 5, a heat-dissipating member 18 (e.g., of silicone resin) is disposed and formed in a sheet shape (e.g., thickness of at most 1 mm) at a spacing between the display panel 13 and the pressing plate 14. The spacing is formed by the panel surface and a recess portion provided to the pressing plate 14, so as not to adversely affect a cell gap of the liquid crystal display panel 13. The display panel comprises a pair of substrates and a liquid crystal disposed therebetween with a cell gap of, e.g., 1–10 µm.

Figure 6A:
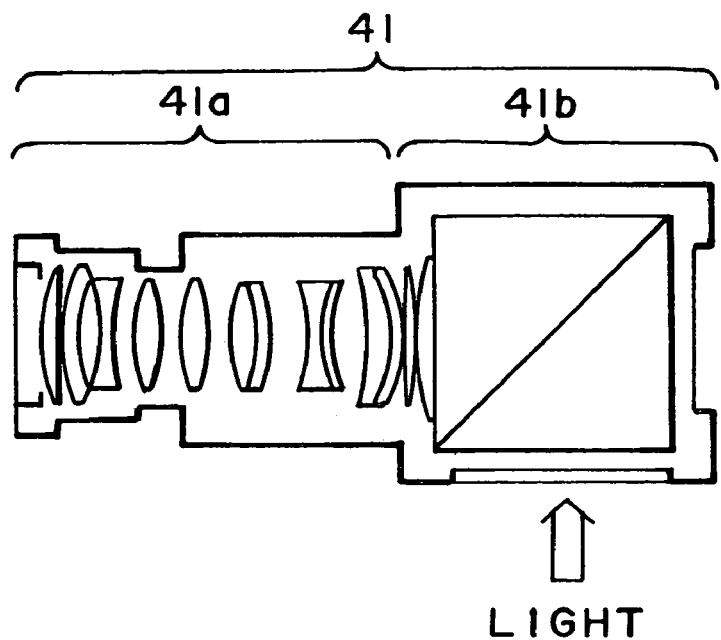
FIG. 6A is a sectional view of a projection lens unit used in the projection display apparatus of the present invention and FIG. 6B is a perspective view thereof.

FIG. 6A is a sectional view of the projection lens unit to be connected with the liquid crystal display panel socket described above, and FIG. 6B is a perspective view thereof for illustrating positioning means of the projection lens unit 41.

Referring to FIG. 6A, the projection lens unit 41 includes a projection lens portion 41a provided with a plurality of projection lenses and a polarization beam splitter (PBS) (as the projection lens support) 41b provided with a window through which incident light emitted from below on the drawing passes.

Figure 6B:
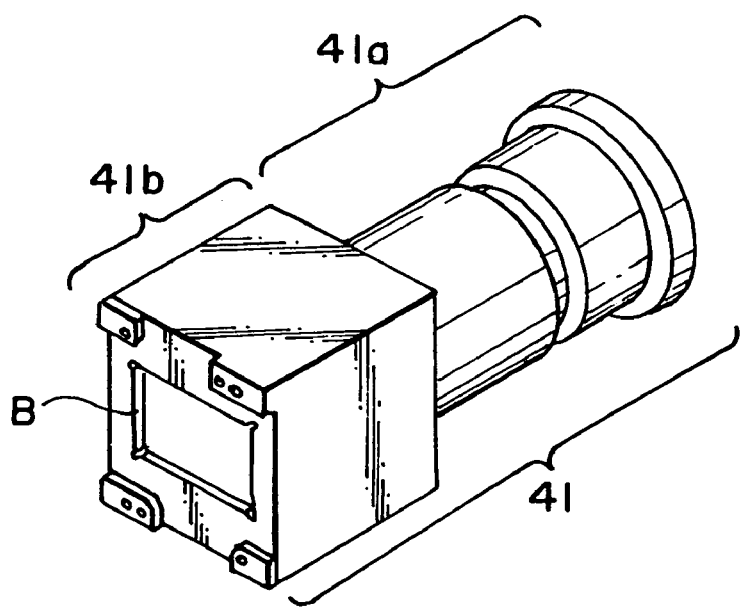

Referring to FIG. 6B, the polarization beam splitter (PBS) 41b is provided with positioning means comprising, e.g., a recess B for positionally aligning the PBS 41b with the socket (holder) 11 in combination with the projection means (the projection A) of the socket 11. The PBS 41b is provided with screw holes (having screw threads) into which the above-mentioned fixing screws 16 (by which the socket 11 is fixed on the circuit board 12) are turned. The shape of the positioning means of the PBS 41b may be appropriately designed based on that of the positioning means of the socket 11. Specifically, the shapes and sizes of the positioning means of the socket 11 and the PBS 41b may appropriately selected so as to provide a stable connecting state therebetween allowing a good optical alignment of the projection lens portion 41b with the liquid crystal display panel 13.

The incident light enters the PBS 41b from its window as described above. The PBS 41b may, e.g., transmit s-polarized light and reflect p-polarized light. The reflected p-polarized light illuminates the liquid crystal display panel 13 (not shown in FIGS. 6A and 6B).

Figure 7:
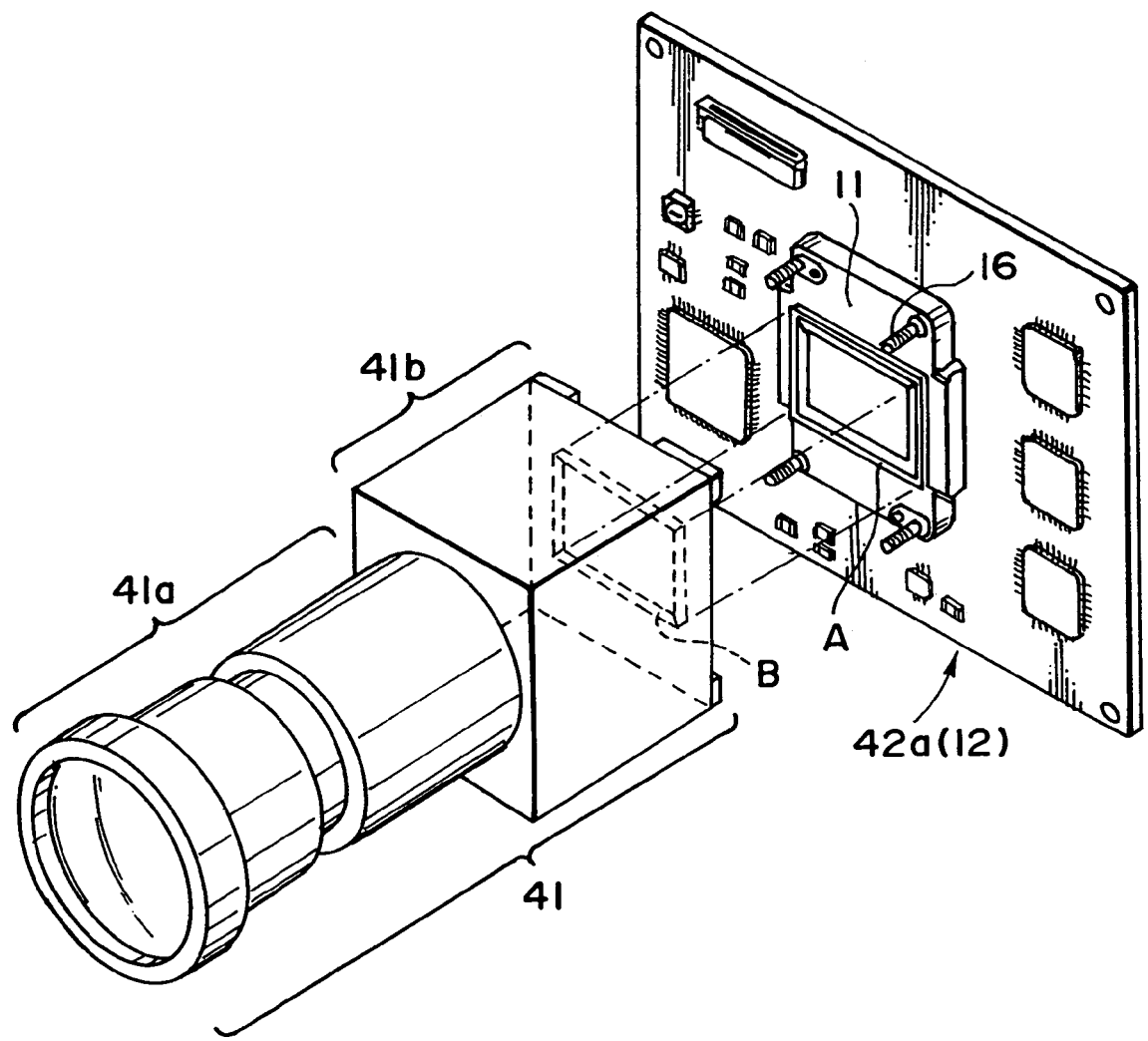
FIG. 7 is a partially exploded perspective view of the circuit board and the projection lens unit used in the projection display apparatus of the present invention.

FIG. 7 is a partially exploded perspective view for illustrating a connecting manner of the liquid crystal display panel socket 11 fixed on the circuit board 42a (12) with the PBS 41b of the projection lens unit 41. In FIG. 7, the shield member 42b as shown in FIG. 1 is omitted from showing.

Referring to FIG. 7, the projection lens unit 41 and the circuit board 42a (12) are disposed so that the recess B of the PBS 41b and the projection A of the socket 11 are confronted with each other at a prescribed distance. The projection A of the socket 11 is inserted and fitted tightly into the recess B of the PBS 41b and then the socket 11 is fixed to the PBS 41b by tightening the fixing screws 16, thus providing the projection-type liquid crystal display apparatus shown in FIG. 1.

Figure 8A:
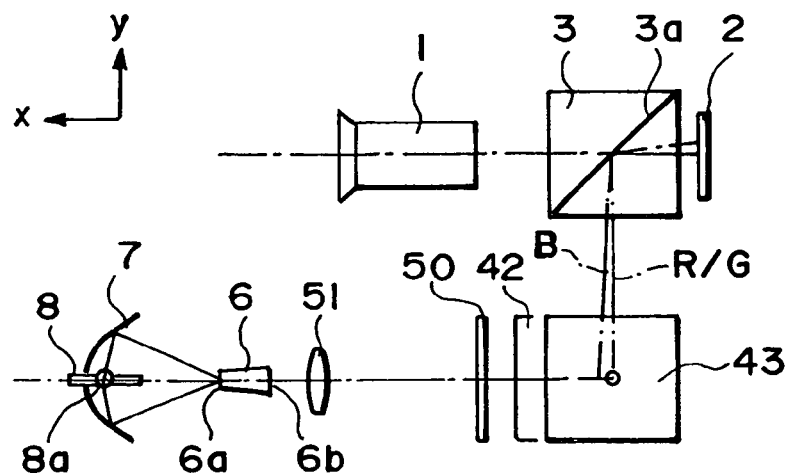
FIGS. 8A–8C illustrate an embodiment of an optical system of the projection display apparatus of the present invention viewed on X-Y, X-Z and Y-Z coordinate systems, respectively.
Figure 8B:
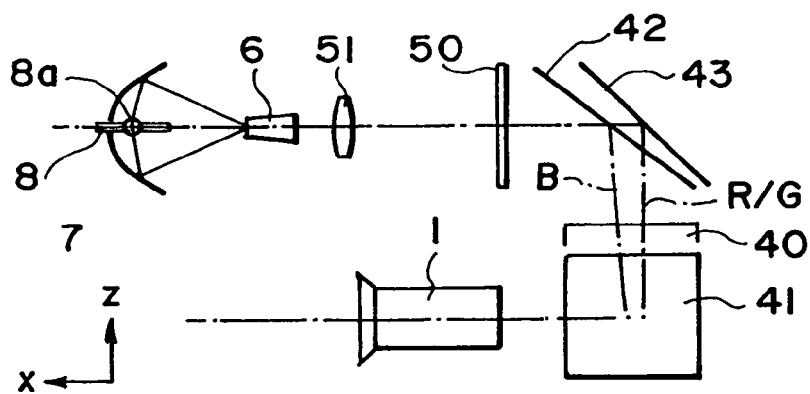
Figure 8C:
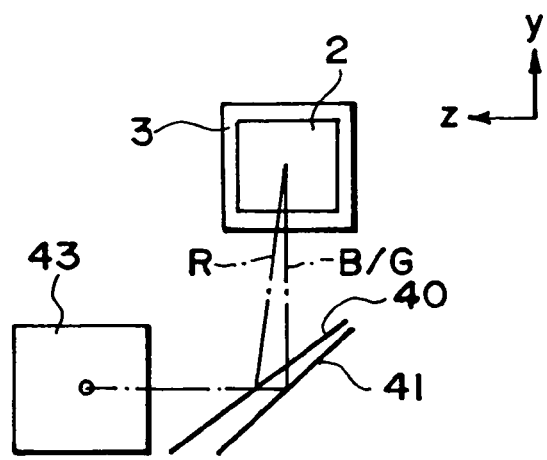

FIGS. 8A, 8B and 8C illustrate an optical system organization of the thus-prepared projection-type liquid crystal display apparatus according to the present invention as viewed on an X-Y coordinate system, an X-Z coordinate system and a Y-Z coordinate system, respectively.

In this optical system, as the liquid crystal display panel, a reflection-type liquid crystal panel comprising, e.g., a liquid crystal panel 2 equipped with a microlens (array) allowing (optical) modulation of light fluxes of red (R), green (G) and blue (B) (R-light, G-light and B-light) by a single panel is used. In place of the microlens-equipped liquid crystal panel 2, it is possible to use an ordinary liquid crystal panel to which a color filter is attached. Further, if the optical arrangement is appropriately modified, a transmission-type liquid crystal panel may be used. It is also possible to use two or three transmission-type or reflection-type liquid crystal panels without being provided with the microlens and/or the color filter.

Referring to FIGS. 8A–8C, the liquid crystal display apparatus includes a projection lens 1, a microlens-equipped liquid crystal panel (liquid crystal display panel) 2, a polarization beam splitter (PBS) 3, an R (red)-light reflection dichroic mirror 40, a B/G (blue & green)-light reflection dichroic mirror 41, a B (blue)-light reflection dichroic mirror 42, a high-reflectance mirror 43 for reflecting all light fluxes, a Fresnel lens 50, a convex lens 51, a rod-shaped integrator 6, an elliptical reflector 7, and an arc lamp 8, as a white light source, such as a metal halide lamp, or UHP (ultra-high pressure mercury lamp).

An image displayed on the liquid crystal panel 2 is enlarged and projected onto a prescribed surface (e.g., screen) by the projection lens 1. The PBS 3 transmits s-polarized light and reflects p-polarized light. The arc lamp 8 has a light-emission surface 8a at the center of the elliptical reflector 7.

Now, the process of light flux progress will be described. First, white light flux emitted from the arc lamp (light source) 8 is condensed by the elliptical reflector 7 at an entrance (incident surface) 6a of the integrator 6 disposed in front of the elliptical reflector 7 and caused to proceed through the longitudinal body of the integrator 6 while causing repetitive reflection within the body for uniformizing the spatial intensity distribution thereof. Then, the light flux emitted from an emitting surface 6b of the integrator 6 is passed through the convex lens 51 and the Fresnel lens 50 to be converted into parallel light flux in a negative (−direction along the x-axis of FIG. 8B and reach the B-reflection dichroic mirror 42.

At the B-reflection dichroic mirror 42, only B (blue)-light fraction is reflected and directed downward in a negative direction generally along the Z-axis with a prescribed angle from the Z-axis toward the R-reflection dichroic mirror 40. On the other hand, the other color light fractions (RG lights) are passed through the B-reflection dichroic mirror 42 to reach the high-reflectance dichroic mirror 43 and are reflected thereat at a right angle downwardly in a negative (−) direction along the Z-axis also toward the R-reflection dichroic mirror 40.

Thus, the B-reflection dichroic mirror 42 and the high reflectance mirror 43 are both disposed so as to reflect the light flux incident thereto in the negative (−) direction along the x-axis into the downward direction ((−) direction along the z-axis) with reference to FIG. 8B. Further, the high-reflectance mirror 43 is disposed (or rotated) at an angle of just 45 deg., and the B-reflection dichroic mirror 42 is disposed at an angle slightly smaller than 45 deg., respectively, from the x-y plane with respect to the y-axis as a rotation axis.

As a result, the R/G lights are reflected by the high-reflectance mirror 43 at a right angle downwardly in the negative direction along the Z-axis, while the B-light is reflected by the B-reflection dichroic mirror 42 downward in a direction forming a prescribed angle (tilted in an X-Z plane) from the Z-axis. In this embodiment, so as to provide an alignment of the illumination region on the liquid crystal panel 2 with the B-light and the R/G-light, the amount of shift from the high-reflectance mirror 43 and the amount of tilt of the B-reflection dichroic mirror 42 are determined so as to have the principal rays of the respective color lights intersect with each other on the liquid crystal panel 2.

Then, the downwardly directed B-light and R/G light are directed to the R-reflection dichroic mirror 40 and the B/G-reflection dichroic mirror 41. In this embodiment, these dichroic mirrors 40 and 41 are disposed below the B-reflection dichroic mirror 42 and the high-reflectance mirror 43.

Further, the B/G-reflection dichroic mirror 41 is disposed (or rotated) at an angle of 45 deg. and the R-reflection dichroic mirror 41 is disposed at an angle slightly smaller than 45 deg., respectively from the x-z plane with respect to the x-axis as a rotation axis.

Accordingly, among R/G/B light fractions, entering these dichroic mirrors, B/G lights are caused to pass through the R-reflection dichroic mirror 40 and are reflected by the B/G-reflection dichroic mirror 41 at a right angle into a positive (+) direction along the y-axis and passed through the PBS 3 to be polarized and illuminate the liquid crystal panel 2. Of these, the B-light flux has been directed in a direction tilted at a prescribed angle with respect to the Z-axis (in the X-Z plane as described with reference to FIGS. 8A and 8B) and, after being reflected by the B/G-reflection dichroic mirror 41, is incident to the liquid crystal panel 2 while retaining the prescribed angle (tilted from the y-axis) as an incidence angle (tilted in the x-y plane).

The G-light is reflected perpendicularly at the B/G-reflection dichroic mirror to proceed in a positive (+) direction along the Y-axis and then polarized by the PBS 3, thereby illuminating the liquid crystal panel 2 at an incidence angle of 0 deg, i.e., perpendicular to the liquid crystal panel 2. Further, the remaining R-light is reflected by the R-reflection dichroic mirror 40 disposed before the B/G-reflection dichroic mirror 41 in a positive (+) direction along the y-axis with a prescribed angle (tilted from the y-axis in the y-z plane) and polarized through the PBS 3 to illuminate the liquid crystal panel 2 with the prescribed tilt angle as an incidence angle from the y-axis in the y-z plane, as shown in FIG. 8C.

Similarly as the high-reflectance mirror 43 and the B-reflection dichroic mirror 42, the amounts of shift from the B/G-reflection dichroic mirror 41 and tilt of the R-reflection dichroic mirror 40 are determined so as to have the principal rays of the respective color lights intersect with each other on the liquid crystal panel 2, thereby aligning the illumination regions by the respective color lights on the liquid crystal panel 2.

Figure 9:
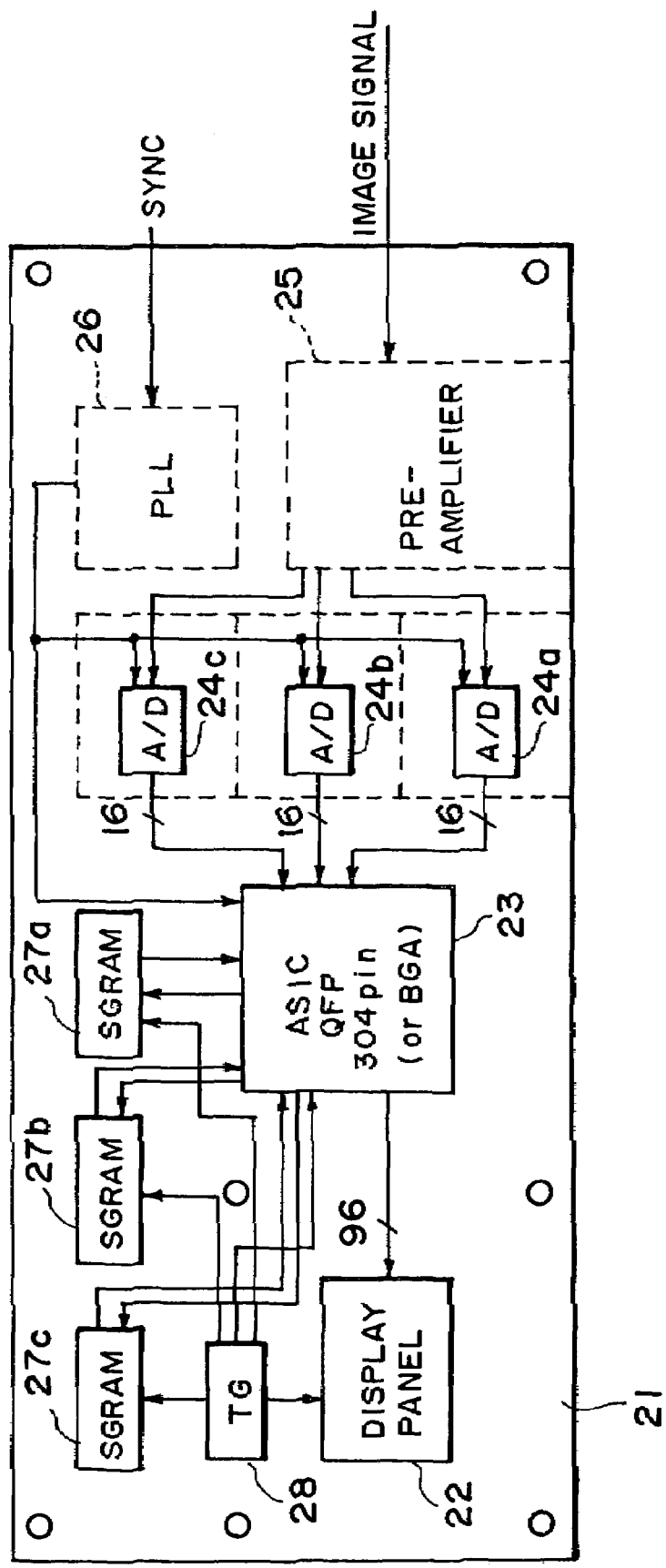
FIG. 9 is a block diagram of a liquid crystal display panel and a drive circuit for driving the display panel used in the projection display apparatus of the present invention.

FIG. 9 is a block diagram of a liquid crystal display panel and a drive circuit for driving the display panel used in the present invention.

The drive circuit shown in FIG. 9 includes a minimum of electrical parts required of an electrical circuit allowing an image signal transmission from an external signal supply unit to the liquid crystal display panel and these electrical parts are integrally supported on a single board.

Referring to FIG. 9, on a (single) board 21, a liquid crystal display panel 22 and a drive circuit therefor including at least electrical parts 23–28. Specifically, the DC includes an ASIC (application specific integral circuit) 23 or BGA (ball grid array) including a QFE ((high density) quad flat package) of 304 pins; AD (analog-to-digital) converters 24a, 24b and 24c; a preamplifier 25; a PLL (phase locked loop) circuit 26; SGRAMs (synchronous graphic random access memories) 27a, 27b and 27c; and a TG (timing generator) 28.

An image signal inputted externally is amplified in an analog manner by the preamplifier 25 and transmitted to the AD converters 24a, 24b and 24c as analog image signals for red (R), green (G) and blue (B), respectively. The respective analog image signals for R, G and B are converted into corresponding digital signals by the AD converters 24a, 24b and 24c, respectively, and then sent to the ASIC 23 as 16 bit signals via three twisted pairs, respectively. The digital signals are processed for, e.g., signal correction, picture (image) processing and/or gamma correction by the ASIC 23 and then sent to the liquid crystal display panel 22 as a 96 bit signal via a twisted pair.

Separately, the PLL 26 detects a synchronizing pulse (SYNC) as an external signal and phase-locks the SYNC. The phase-locked SYNC is transmitted to the ASIC 23 and the AD converters 24a, 24b and 24c, respectively.

Each of the SGRAMS 27a, 27b and 27c temporarily memories signals before and during the processing of the ASIC 23. In this embodiment, three SG RAMS 27a, 27b and 27c are used but may appropriately be changed in number thereof depending on a required processing.

The TG 28 supplies timing pulses to the liquid crystal display panel 22, the ASIC 23 and the SGRAMs 27a, 27b and 27c.

In this embodiment shown in FIG. 9, eight (8) bit AD converters 24a, 24b and 24c each using a twisted pair providing 16 bit signal lines and a digital display panel of XGA (extended graphics array: 1024×768 pixels) are used but may appropriately be modified in the number of bits and signal lines depending on specifications of a liquid crystal display panel and AD converters used.

Figure 10:
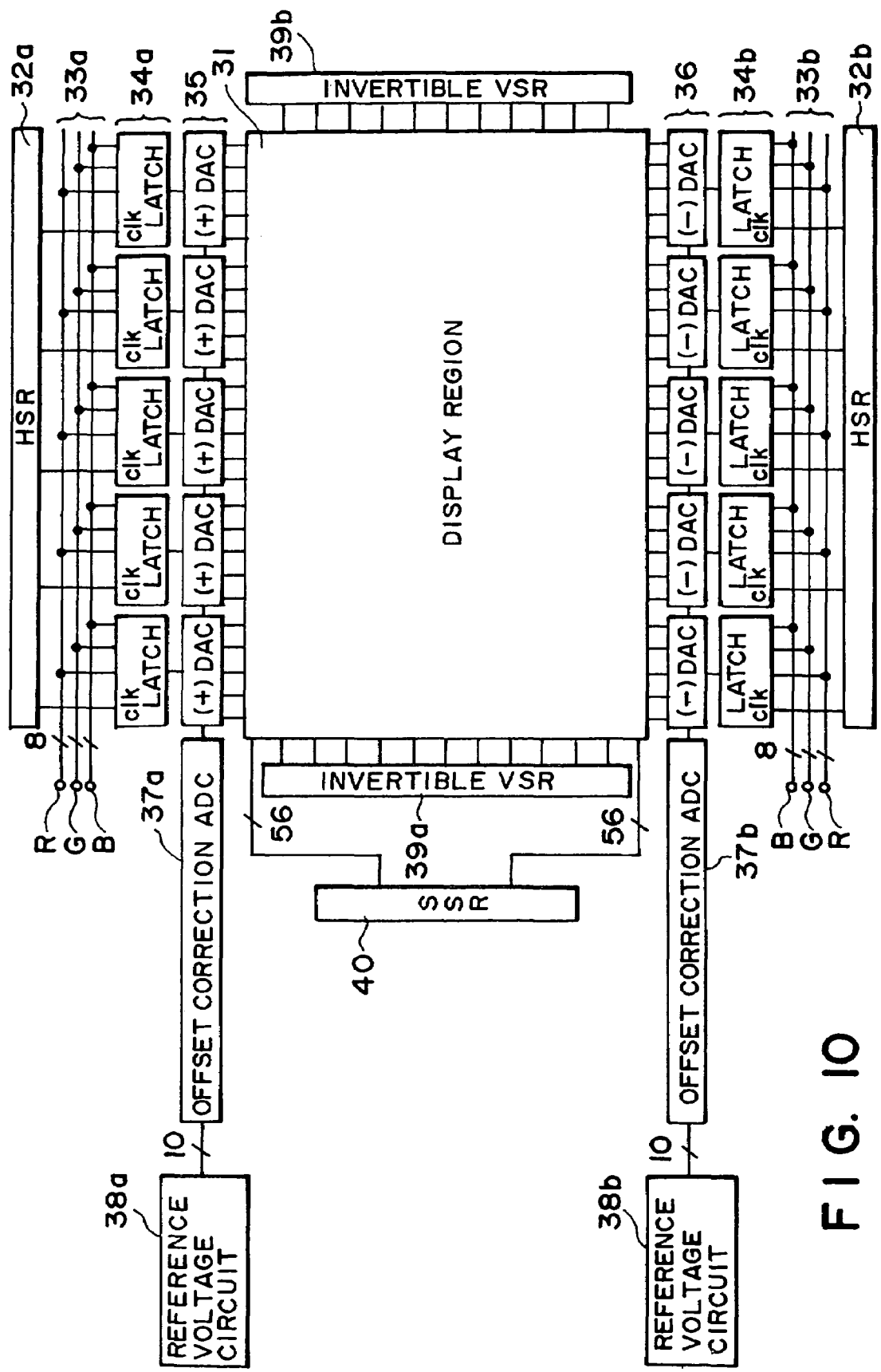
FIG. 10 is a block illustration of an embodiment of the liquid crystal display panel.

FIG. 10 is an example of a block illustration of the digital (liquid crystal) display panel 22 shown in FIG. 9.

Referring to FIG. 10, the digital display panel principally includes a display region 31; shift registers 2a, 32b, 39a and 39b disposed along four sides of the display region 31 by forming the shift registers directly on a substrate for the display panel; and a plurality of DAC (digital-to-analog converters) 35 and 36.

The display region 31 is composed of a multiplicity of pixels (pixel switches) formed in a matrix to which the shift registers 32a and 32b (disposed along longer two parallel sides of the display region 31 (in a horizontal direction) indicated as "HSR" in FIG. 10) output timing pulse (signals) for writing digital image signals in the display region 31, respectively.

Specifically, e.g., in odd-number fields, the shift register (HSR) 32a operates but the (opposite) shift register (HSR) 32b does not operate in order to prevent burning or sticking of a liquid crystal in the display region 31. In this connection, in even-number fields, the above operations for the HSRs 32a and 32b are reversed.

In the odd-number fields, positive-polarity (+) signal lines 33a for R, G and B supply digital signals to latches (LATCH) 34a. The latches 34a receive the timing signals from the HSR 32a and supply the digital signals (stored therein) to the (+) DACs 35, respectively. The (+) DACs 35 write signals subjected to offset correction in the display region. The offset correction is performed by correcting a preliminarily measured offset of the DACs 351 based on a reference voltage by using an offset correction ADC (analog-to-digital converter) 37a, thus modifying the signals of the (+) DACs 35 into signals free from offset. The reference voltage for determining an amount of the offset is supplied from a reference voltage circuit 38a.

Similarly, in the even-number fields, negative-polarity (–) signal lines 33b supply digital signals to latches (LATCH) 34b. The latches 34b receive the timing signals from the HSR 32b and supply the digital signals to the (–) DACs 36, respectively. The (–) DACs 36 write signals subjected to offset correction in the display region. The offset correction is performed by an offset correction ADC (analog-to-digital converter) 37b, thus modifying the signals of the (–) DACs 36 into signals free from offset. The reference voltage for determining an amount of the offset is supplied from a reference voltage circuit 38a.

The display signals outputted from the (+) DACs 35 and the (–) DACs 36 are written in associated pixels, respectively, by sequentially selecting or scanning each (displaying) row line (horizontal scanning line) in a column direction with inversible VSRs (vertical shift registers) 39a and 39b while sequentially selecting a corresponding line in a row direction (longitudinal direction of the display panel 31). In this embodiment, the horizontal scanning operation can be performed from the first (uppermost) line or the last (lowermost) line by the inversible VSRs 39a and 39b. This function may essentially be required for applying the liquid crystal panel to a projection-type display apparatus.

FIG. 11 is a schematic plan view of a layout of circuit parts (chips) on a substrate for the liquid crystal display panel shown in FIG. 10.

Referring to FIG. 11, similarly as in FIG. 10, shift registers (HSRs and VSRs) are disposed along four sides of a display region and the liquid crystal display panel also includes DACs for converting digital signals to analog signals.

On a substrate, a plurality of electrodes for inputting signals are disposed along shorter two parallel sides (outside the opposite VSRs) of the substrate. These electrodes are disposed in view of positional deviation thereof at the time of fitting in the above-described (liquid crystal) display panel socket 11. Specifically, on each shorter side, electrodes (52 pins) in a size of 0.3 mm×0.5 mm are disposed with a spacing (between adjacent electrodes) of 0.5 mm. As a result, the substrate is totally provided with electrodes including 104 pins on its entire surface.

In the present invention the display panel is not restricted to a liquid crystal display panel. For instance, it is possible to adopt a DMD (digital mirror device) utilizing a mechanical modulation scheme.

As described hereinabove, according to the projection display apparatus of the present invention, the use of the liquid crystal display panel socket (holder) incorporating therein the liquid crystal display panel allows an integrated structure wherein the liquid crystal display panel is directly mounted on the circuit board provided with the drive circuit for the display panel while ensuring electrical connection therebetween without using a flexible substrate as used in the conventional projection-type display apparatus. As a result, replacement of the liquid crystal display panel and maintenance of the display apparatus can be readily performed.

Further, when the display panel is replaced with another one, structural members other than a circuit board constituting a projection-type display apparatus can be detached therefrom and reused, thus improving a recycling performance of the display apparatus to reduce an amount of resulting industrial waste.

Further, according to the present invention, the socket (holder) provided with positioning means is effective in positionally and optically aligning the projection lens unit with the socket, thus resulting in connection of the projection lens unit with the socket. As a result, the projection lens and the display panel are well positionally aligned with each other more easily while ensuring optical alignment therebetween.

What is claimed is:
1. A projection display apparatus, comprising:
a display panel comprising a rectangular substrate having four sides including first and second pairs of opposite sides, and a plurality of electrodes disposed along only the first pair of opposite sides;

a circuit board provided with a drive circuit for driving said display panel;

a projection lens support provided with a projection lens for projecting an enlarged image onto a screen; and a holder for holding said display panel and provided with positioning means for positioning said holder and said projection lens support, wherein said projection lens support is positionally aligned and connected with said display panel via said holder by said positioning means, and wherein said display panel, said projection lens support, and said circuit board are integrally fixed by fixing screws, and said plurality of electrodes and circuit board are electrically connected by said fixing screws, wherein said display panel further comprises shift registers disposed along said four sides, and converters for converting digital signals to analog signals, said converters being disposed along opposite two sides of said substrate.

* * * * *

UNITED STATES PATENT AND TRADEMARK OFFICE
CERTIFICATE OF CORRECTION

PATENT NO. : 6,971,750 B1 Page 1 of 1
APPLICATION NO. : 09/472989
DATED : December 6, 2005
INVENTOR(S) : Shunsuke Inoue et al.

It is certified that error appears in the above-identified patent and that said Letters Patent is hereby corrected as shown below:

Title Page,
[56] REFERENCES CITED:

U.S. PATENT DOCUMENTS, insert the following:
    --6,628,253    *    9/2003    Hiroki ................................ 345/87
      5,499,036    *    3/1996    Hauck ................................ 345/3.1--.

COLUMN 7:

Line 28, "(-direc-" should read --(-) direc- --.

COLUMN 9:

Line 9, "memories" should read --remembers--.
    Line 26, "registers 2a," should read --registers 32a,--.

COLUMN 10:

Line 5, "inversible" should read --invertible--.
    Line 10, "inversible" should read --invertible--.

Signed and Sealed this

Fifteenth Day of August, 2006

JON W. DUDAS
*Director of the United States Patent and Trademark Office*